United States Patent [19]
Fuld et al.

[11] Patent Number: 5,867,685
[45] Date of Patent: Feb. 2, 1999

[54] SYSTEM AND METHOD FOR SEQUENTIAL DETECTION IN A CACHE MANAGEMENT SYSTEM

[75] Inventors: Stephen T. Fuld, Boulder; Stephen S. Selkirk, Lafayette, both of Colo.

[73] Assignee: Storage Technology Corporation, Louisville, Colo.

[21] Appl. No.: 521,026

[22] Filed: Aug. 29, 1995

[51] Int. Cl.[6] ................................................... G06F 12/08
[52] U.S. Cl. ........................................... 395/440; 395/464
[58] Field of Search ..................................... 395/440, 464

[56] References Cited

U.S. PATENT DOCUMENTS

| | | | |
|---|---|---|---|
| 4,875,155 | 10/1989 | Iskiyan et al. | 395/440 |
| 5,146,578 | 9/1992 | Zangenehpour | 395/464 |
| 5,201,053 | 4/1993 | Benhase et al. | 395/289 |
| 5,253,351 | 10/1993 | Yamamoto et al. | 395/440 |
| 5,381,539 | 1/1995 | Yanai et al. | 395/460 |
| 5,426,761 | 6/1995 | Cord et al. | 395/441 |

*Primary Examiner*—Tod R. Swann
*Assistant Examiner*—Reginald G. Bragdon
*Attorney, Agent, or Firm*—Sterne, Kessler, Goldstein and Fox

[57] ABSTRACT

A cache management system and method for detecting sequentiality in a series of memory accesses by a host system to data stored in tracks on a storage device is disclosed. The system includes a system memory for storing a data structure associated with each track. Each data structure includes a last sector/record referenced information field and a state information field. A cache controller identifies a current track and a location within the current track of a record referenced in a current memory access. The cache controller determines whether the current memory access and the previous M ($M \geq 1$) accesses to records in the current track are in sequence based on the values of the last sector/record referenced information field and the state information field associated with the current track.

15 Claims, 4 Drawing Sheets

| WHEN AT TRACK # | PRESTAGE REQUEST | PAR | SAL (K1) | MOVE TO LRU IF READS (K3) | MOVE TO DESTAGE LIST IF WRITES (K4) |
|---|---|---|---|---|---|
| 145 (ASSUME 144 NOT REF & DX = SEQ) | 146–153 | 8 | 8 | 142 | 129 |
| 146 | NONE | 7 | 8 | 143 | 130 |
| 147 | NONE | 6 | 8 | 144 | 131 |
| 148 | NONE | 5 | 8 | 145 | 132 |
| 149 | NONE | 4 | 8 | 146 | 133 |
| 150 | NONE | 3 (K2) | 8 | 147 | 134 |
| 151 | 154–162 | 10 | 8 | 148 | 135 |
| 152 | NONE | 9 | 8 | 149 | 136 |

*Figure 4*

SYSTEM AND METHOD FOR SEQUENTIAL DETECTION IN A CACHE MANAGEMENT SYSTEM

BACKGROUND OF THE INVENTION

1. Field of the Invention

This invention relates generally to memory subsystems for the storage of data in data processing systems. More particularly, the invention relates to an improved system and method for detecting sequentiality in memory accesses.

2. Related Art

Data caching is a well known technique for eliminating delays in memory access due to mechanical limitations of a storage device. For example, in the case of a disk drive, plural disks rotate at a fixed speed past read/write heads which may either be stationary with respect to the disk or move radially back and forth with respect to the disk in order to juxtapose the heads to various portions of the disk surfaces. In either case, there is a finite average time (access time) required for a particular data record to be located and read from the disk. This "access" time includes the time for a head to move to the correct cylinder (seek time) and the time required (or latency) for the disk to rotate with respect to the head until the beginning of the particular record sought is juxtaposed to the head for reading and writing.

Cache data storage eliminates these inherent delays by storing records in frequently accessed tracks in a high speed system memory (e.g., solid-state RAM). The idea is simply to allow as many memory accesses as possible to immediately retrieve data from the high speed system memory rather than wait for the data to be transferred (or staged) from the slower disk storage device to the high speed system memory. To accomplish this task, data may be staged into the high speed system memory before data access is required (i.e., prestaged).

Clearly, the effectiveness of the cache data storage system is limited by the system's ability to anticipate the needs of future memory accesses and transfer those data records from disk storage to the high speed system memory prior to the memory access. These general considerations are described in Houtemaker et al., "MVS I/O Subsystems: Configuration Management and Performance Analysis", McGraw-Hill, 1993, which is hereby incorporated by reference in its entirety.

If a sequence of memory accesses is random in nature, the cache data storage system cannot anticipate future memory accesses. Accordingly, one method of anticipating future memory accesses is to identify sequential or near sequential memory accesses. Once a sequential or near sequential access is identified, future records/tracks in the sequence can be immediately prestaged into the high speed system memory in advance of future memory accesses.

To identify sequential access, two methods are generally used. In one method, the system utilizes "hints" provided by the host operating system to go into sequential mode. Examples of disk storage systems which rely on hints from the host operating system include the Storage Technology Corporation Iceberg RAID data storage subsystem and the International Business Machines Corporation Model 3390 data storage subsystem.

Other systems, however, promote software transparency by detecting sequential access independently of the contents of either the memory access request or the data record itself. In other words, no distinguishing mark is evident in either the memory access request or the data record to identify sequentiality. In these systems, the cache data storage system must provide some internal means for effectively distinguishing between sequential and randomly accessed data records. An example of this type of system is the Symmetrix subsystem available from EMC Corporation which relies on the accessing of multiple tracks sequentially before sequentiality is identified.

Generally, any internal sequential detection system involves design tradeoffs that include variations in cache memory size, processing overhead required to administer the sequential detect algorithm, number of tracks staged upon detection of sequentiality, etc. For example, the limited size of cache memory directly influences the number of tracks that may be speculatively staged into the high speed system memory. This follows since, generally, the cache memory is a costly resource that must be managed properly to increase system performance. As a further consequence, the limited size of cache memory increases the number of acceptable "misses" prior to finding sequentiality. In this context, a "miss" is an access to a record that has not been prestaged into the high speed system memory. Clearly, prestaging of tracks should not occur unless there exists a sufficient probability that those staged tracks will be the subject of future memory accesses. Finally, the overhead required to administer the sequential detection system must not become overly burdensome wherein the performance of the cache data storage system itself is compromised.

Thus, what is needed is a low overhead, accurate sequential detection system and method that minimizes the number of cache "misses".

SUMMARY OF THE INVENTION

The invention satisfies the above mentioned needs by providing a low overhead system that detects sequentiality with a minimal number of cache "misses". In particular, the invention provides a system and method for tracking memory accesses at the record level as opposed to the track level. By analyzing the memory accesses at a finer granularity without excessively increasing the overhead, the system minimizes the number of "misses" prior to detecting sequentiality.

Specifically, the invention first maintains within system memory, a cache directory entry for each track. The directory entry includes a data structure comprising four data fields. In a preferred embodiment, the four data fields include the last sector/record referenced (LSRR), the state of the track (ST), the number of pre-stages already requested (PAR), and the stage ahead limit (SAL).

In operation, the system and method for sequential detection first initializes the ST field of a track to an initial state prior to being accessed for the first time. Upon a first access to the track, the ST field of the track is set to a first nonsequential state and the LSRR field is set to the number of the record that was accessed. In other words, if the nth record on the track was accessed, the LSRR field is set to the value n. Upon a subsequent access to the (n+1)th record of the track, the ST field of the track is set to a second nonsequential state and the LSRR field is set to the value (n+1). Finally, after a subsequent access to the (n+2)th record of the track, the ST field of the track is set to a sequential state.

As a variation of the system and method described above, the LSRR field may alternatively store sector numbers instead of record numbers. In this variation, the LSRR field would store the sector number of the end of the last transfer done on the track in the previous access. Upon a subsequent access to the track, if the sector at the beginning of the first transfer done on the track is within an acceptable range of the sector number in the LSRR field, then the ST field is changed to the following state in the sequence.

As an exception to the basic sequence outlined above, if it is determined that the previous track is in cache and is in a sequential state, then the ST field of the track is immediately set to a sequential state. Also, if the record size is large enough such that a track contains fewer than four records, a sequential state may be reached after accessing two consecutive records only. Finally, a track may immediately enter a sequential state based on hints provided by the host system. Specifically, a sequential state is reached if either (1) the sequential bit is set in a Define Extent command, (2) a Read Track command is received, (3) a Read Multiple Count Key Data command is received, or (4) a Write Count Key and Data Next Track command is received.

BRIEF DESCRIPTION OF THE PREFERRED EMBODIMENTS

The foregoing and other features and advantages of the invention will be apparent from the following, more particular description of a preferred embodiment of the invention, as illustrated in the accompanying drawings.

FIGS. 3 and 4 show the effect of adjustment parameters on staging and destaging of tracks after sequentiality has been detected.

DETAILED DESCRIPTION OF THE PREFERRED EMBODIMENTS

The preferred embodiment of the invention is discussed in detail below. While specific configurations are discussed, it should be understood that this is done for illustration purposes only. After reading the following description, it will become apparent to a person skilled in the relevant art that other components and configurations may be used without parting from the spirit and scope of the invention.

Figure 1:
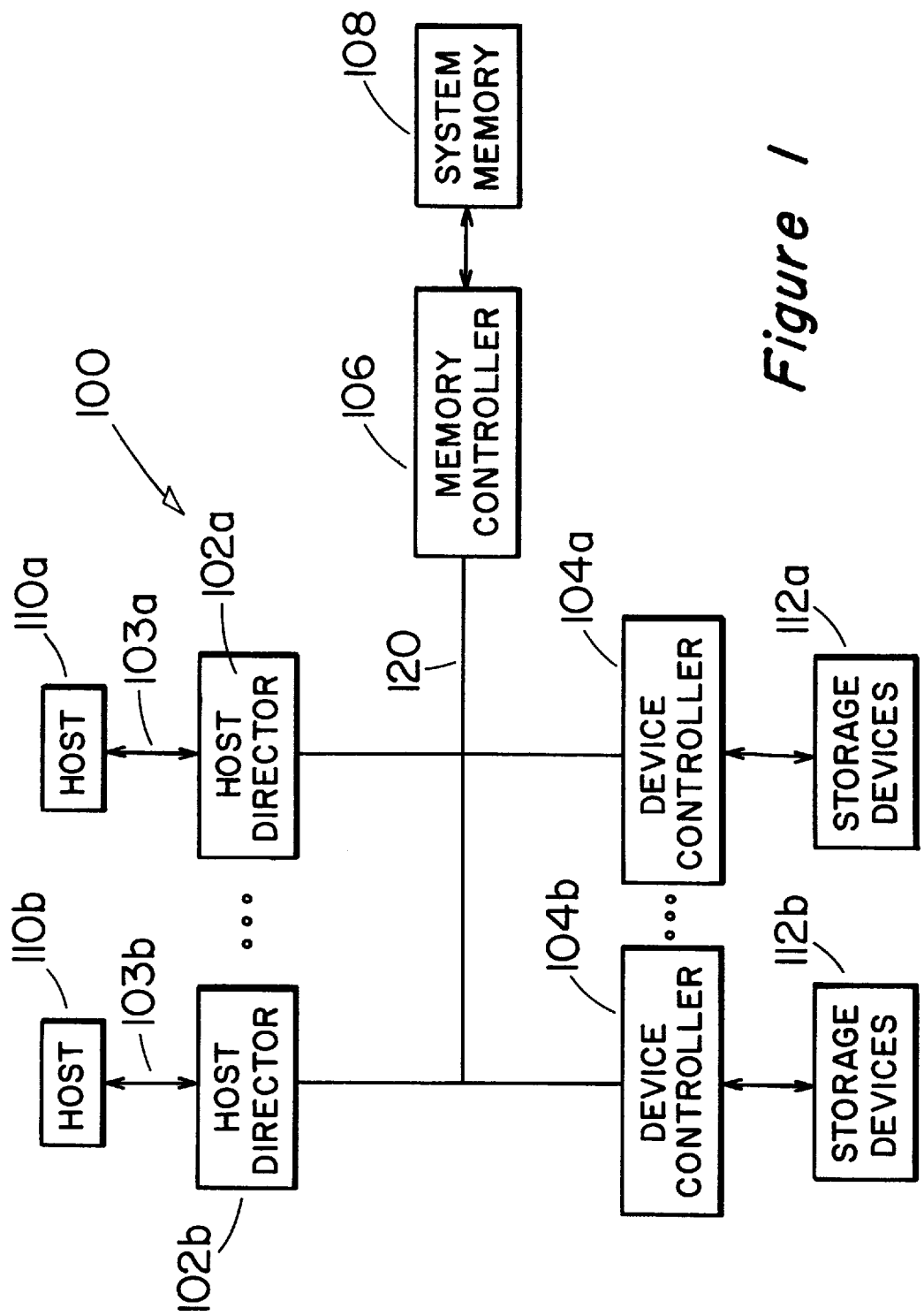
FIG. 1 shows a high level diagram of a disk array system that incorporates the sequential detection system and method of the present invention.

FIG. 1 shows a simplified illustration of a cache management system 100. Cache management system 100 includes host directors 102a–102b that are adapted to receive data read/write commands and associated data over one or more communication channels 103a, 103b from one or more hosts 110a–110b. Host directors 102a–102b are coupled to system memory 108 via memory controller 106. Host directors 102a–102b are coupled to memory controller 106 by means of bus 120.

Cache management system 100 also includes device controllers 104a–104b. Device controllers 104a–104b are coupled to one or more storage devices 112a–112b and serve to control the reading and writing of data to or from the respective data storage devices 112a–112b. Device controllers 104a–104b are also coupled to memory controller 106 by means of bus 120.

In operation, cache management system 100 reduces access time by a host 110a–110b to data stored in storage devices 112a–112b by storing data temporarily in system memory 108. A host 110a–110b can then access data from system memory 108 without suffering the inherent delays associated with the seek and latency times of mechanical storage devices 112a–112b. To maximize the effectiveness of this technique, cache management system 100 must accurately predict what data to prestage into system memory 108. The present invention provides an improved method of accurately identifying these sequential memory accesses while suffering a minimal number of "misses".

In accomplishing this goal, the system and method for sequential detection relies on either internal memory access analysis or "hints" from host systems 110a–110b. In describing the operation of this combined system, the system and method can be divided into the following functional parts: detection of sequentiality, operation in sequential mode, and termination of sequential mode. Each of these parts will be discussed separately in detail below.

In the following description, reference is made to "sectors", "records" and "tracks". While each of these terms has an accepted meaning within the field of disk storage systems, the invention described is not intended to be limited by these terms. More generally, a "track" represents any increment of data that is staged into system memory from a physical storage device while "sectors" and "records" represent units of data within a "track".

Detecting Sequentiality

Generally, the detection of sequentiality is improved over known systems by analyzing a sequence of memory accesses at the record level rather than the track level. This approach minimizes the number of "misses" by identifying sequentiality within a single track rather than across multiple tracks. Clearly, if sequentiality is detected only after a sequence of multiple tracks are accessed, the first record accessed in each of the initial tracks is accessed without the benefit of being prestaged in the cache data storage system.

Of course, merely refining the sequential detection to a smaller scale does not automatically produce a more efficient cache data storage system. In particular, the increased overhead required for analysis at a finer granularity degrades performance since one can reasonably expect an order of magnitude increase in the overhead costs involved in the monitoring and analysis of memory accesses. Moreover, any method that identifies sequentiality faster than known systems must insure that a plurality of tracks are not staged prematurely. The present invention, balances these concerns by providing a system and method for analyzing memory accesses at the record level without substantial increases in overhead. As a consequence, the sequential detection system of the present invention minimizes the number of misses prior to the detection of sequentiality without significantly impacting system performance.

Specifically, the system and method for sequential detection stores, in system memory, a data structure in a directory entry for each track. In a preferred embodiment, the data structure is divided into four 8-bit fields that include the Last Sector/Record Referenced (LSRR), State (ST), Pre-stages Already Requested (PAR), and Stage Ahead Limit (SAL) information fields. The LSRR and ST fields are used primarily in the sequential detection phase. The PAR and the SAL fields, on the other hand, are utilized after sequentiality has been detected. The LSRR and ST fields are described in detail in this section below. An operative description of the PAR and SAL fields is given in a following section.

The LSRR information field contains the last record number referenced on the track. Alternatively, the LSRR information field contains the cache sector number of the end of the last transfer done on the track. As defined, a sector is a fixed length portion of memory on the disk. The specific choice between these two options depends on the actual system implementation. For example, if record numbers are used, a non-standard track layout such as non-consecutively ascending record numbers may not be seen as sequential. On the other hand, if sector numbers are used, the sequential test will have to consider key fields, skipped sectors, etc. to identify an acceptable range between accessed sectors that can be recognized as part of a sequence of sequential accesses.

The ST information field contains the state of the corresponding track. The possible values of the ST field are listed in Table 1. A more detailed description of these states as they relate to FIG. 2 is given in more detail below.

The PAR information field identifies the number of tracks that have already been requested ahead of this track. This field is set when a stage ahead request is made after detection of sequentiality. Finally, the SAL information field identifies the number of tracks that the system desires to be staged ahead relative to that track.

Figure 2:
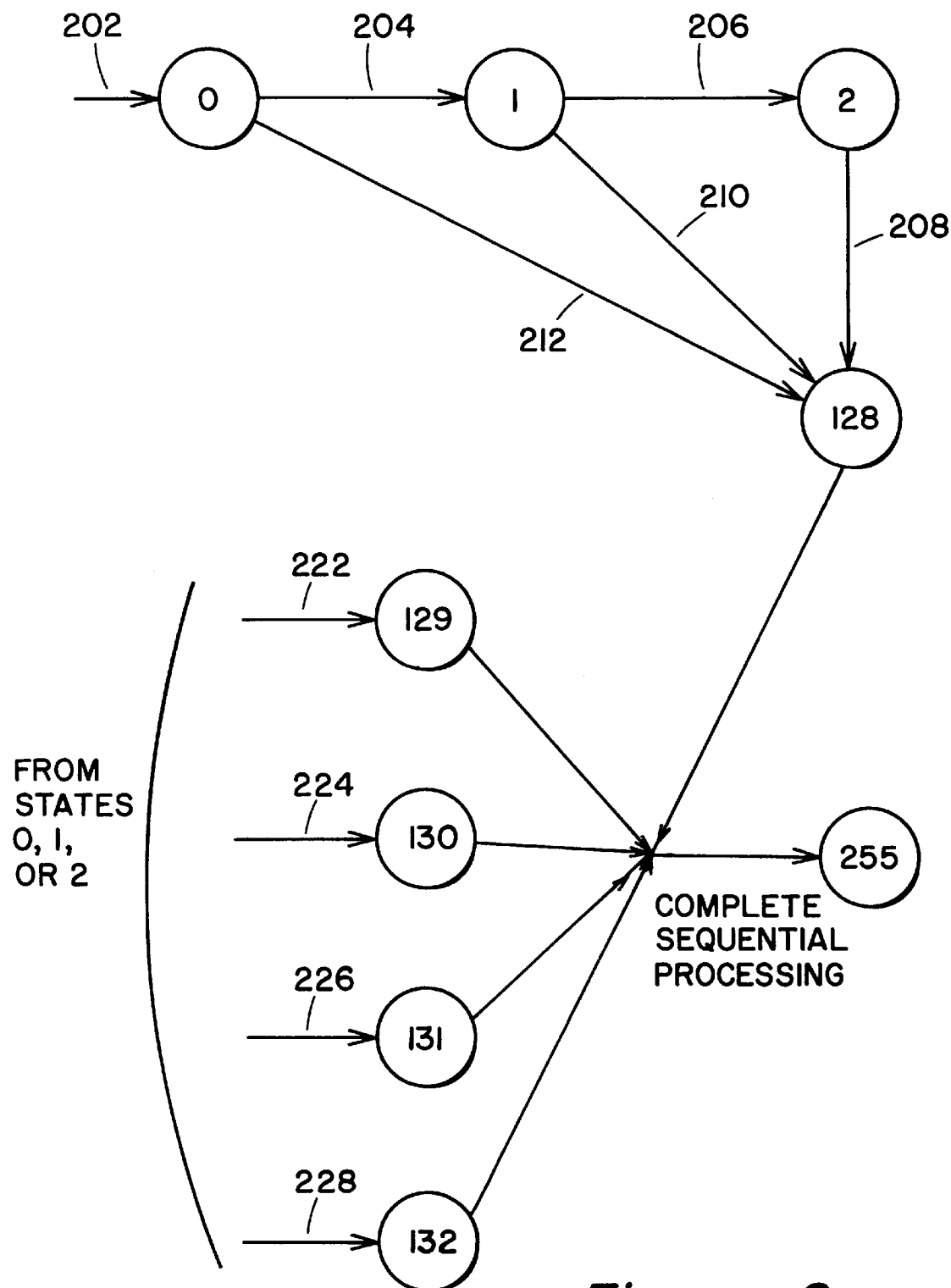
FIG. 2 shows a state diagram that identifies the process of identifying sequentiality in memory access requests.

In operation, the system and method for sequential detection follows the general system flow illustrated in FIG. 2. Each of the states in FIG. 2 is defined below in Table 1. The transition between any of states 0, 1, 2 and 128 represent the operation of the internal sequential detection system of the present invention. States 129–132, on the other hand, represent the aspects of the sequential detection system that rely on hints by a host system 110a–110b.

TABLE 1

| State | Description |
|---|---|
| 0 | Set when track is first staged (Indicates not yet accessed). |
| 1 | Set when first accessed if previous track not in cache or not marked sequential. |
| 2 | Set when sequential is detected by an access to the next record or next sector within a range (Indicates probably sequential). |
| 3–127 | Reserved for future use. |
| 128 | Set when state is equal to 2 and an access to the next record or sector within a range is made (Indicates detected sequentiality). |
| 129 | Set when sequential bit is set in Define Extent command. |
| 130 | Set when a Read Track command is received. |
| 131 | Set when a Read Multiple Count Key Data command is received. |
| 132 | Set when a Write Count Key and Data Next Track command is received. |
| 133–254 | Reserved for future use. |
| 255 | Set when sequential processing for track is completed (prevents staging of same tracks). |

The internal sequential detection system begins by setting the ST field of a track equal to 0 when a device controller 104a–104b completes the staging of that track. This step is illustrated by transition 202 in FIG. 2. When a host director 102a–102b subsequently accesses a staged track and finds ST equal to 0, host director 102a–102b checks the directory entry for the previous track (unless the current track is Cylinder 0 Head 0). If the ST field in the previous track did not have the high order bit set (i.e., ST<128) then host director 102a–102b changes the ST field in the current track from state 0 to state 1 and sets the LSRR field to the number of the record that was accessed. Alternatively, the LSRR field is set to the sector number of the end of the last transfer done on the track. This step is illustrated by transition 204.

Ordinarily, the first access to a particular track merely serves notice that a memory access to a record on the track has occurred. At this point, even if the first memory access to the track is the start of a sequence, the memory access is indistinguishable from a random memory access.

However, if the previous track was in cache and the ST information field did have the high order bit set (i.e., ST≧128), then sequentiality is detected and the ST field for the current track is changed from state 0 to state 128 (transition 212). This scenario may occur in the following situations. In one example, the record accessed in the current track could be the first positioned record in the track that follows after the last positioned record in the previous track. In other words, the access has continued sequentially from the previous track to the current track. In another example, the record accessed in the current track does not directly follow the last record accessed in the previous track (i.e., near sequential accessing). In either case, sequentiality is detected after the first access into the current track.

If the first access into a track is not conclusive (i.e., ST=1), then the internal sequential detection system must await future accesses to that particular track before detecting sequentiality. Specifically, upon a subsequent access to the track, host director 102a–102b checks the LSRR field in the directory entry. If the record number sought to be accessed is one greater than the record number stored in the LSRR field (or the sector number is within an acceptable range of the last sector accessed as indicated by the LSRR field), then the ST field is changed from state 1 to state 2 (transition 206) and the LSRR field is updated to the appropriate sector/record number. State 2 represents an intermediate state within the sequentiality hierarchy.

Conversely, if a subsequent access to a record does not indicate possible sequentiality, only the LSRR field is updated if needed. The state of the track remains unchanged. This allows the sequential detect system to handle a typical read/update/write sequence for batch database updates.

Although accesses to consecutive records within a track suggests possible sequentiality, a second confirmation is utilized to minimize false positives. Since a false positive may lead to the unnecessary prestaging of multiple tracks into system memory 108, care is taken to limit any premature staging decisions.

In alternative embodiments, additional intermediate stages may be used to further minimize false positives. Whether such additional stages are necessary depends upon the size, position, etc. of records within the track in light of the general tradeoff between prestaging too many tracks too early and incurring "misses" by waiting too long.

In the preferred embodiment, transition 210 between state 1 and state 128 represents an exception to the necessity of utilizing intermediate state 2. This exception is based purely on the size of the records being accessed. For example, if the record sizes are larger than 15,476 bytes (i.e., maximum record size for 3 records/track in the International Business Machines 3380 disk family) then a subsequent access to a track will prompt the ST field to be changed from state 1 to state 128 (i.e., sequentiality detected). As would be clear to one of ordinary skill in the relevant art, the exact threshold of the record size (or maximum records/track) may vary depending upon a particular system implementation and application.

Preferably, the sequential detection method requires a second confirmation before sequentiality is indicated/detected. Thus, if the record number in a subsequent access to a particular track with ST=2 is one greater than the record number stored in the LSRR field (or within an acceptable range of the last sector accessed), then the ST field is changed from state 2 to state 128 (transition 208), indicating the detection of sequentiality.

While states 0, 1, 2 and 128 describe an internal sequential detection method, states 129–132 describe an aspect of the sequential detection system that relies on hints from host system 110a–110b. Transitions 222, 224, 226, 228 to any of states 129–132 may occur at any time during the flow within the internal sequential detection system. Thus, the ST field of a track may transition from any of states 0–2 to any of states 129–132.

Specifically, transition 222 to state 129 occurs when the sequential bit is set in the Define Extent command, transition 224 to state 130 occurs when a Read Track command is received, transition to state 131 occurs when a Read Multiple Count Key Data command is received, and transition to state 132 occurs when a Write Count Key and Data Next Track command is received. In each of states 129–132, the high order bit is set and sequentiality is detected.

In a further embodiment, a similar transition would occur based on the contents of the parameters of a Locate Record command. For example, by using the count and transfer length factor of the Locate Record command, the sequential detect system can identify how many tracks should be prestaged. Similarly, in an alternative embodiment, the sequential detect system utilizes the count in the Locate Record command and the block size in the Define Extent command to identify how many track to be prestaged. In both cases, the sequential detect system utilizes "hints" to identify the extent of prestaging.

Dynamic Operation in Sequential Mode

Once sequentiality is detected, the central issue becomes when and how far to stage ahead and when and how far to destage or deallocate behind. When destaging, cache management system copies the contents from cache to disk. When deallocating, cache management system makes an area of cache available for future use. Generally, if a write has occurred, a track is destaged before being deallocated. If only reads have occurred, a track may simply be deallocated.

In one embodiment, a stage ahead decision is made at the end of a locate record domain and/or the command chain. To facilitate the dynamic staging-destaging/deallocating process, five dynamic adjustment parameters (K1–K5) are defined as follows:

K1 How much to stage ahead (Subsequent Requests);
K2 How much is left in previous stage ahead request before requesting more;
K3 How far to deallocate behind (Reads);
K4 How far to destage behind (Writes); and
K5 How much to stage ahead (First Time).

The K1, K2 and K5 adjustment parameters control the staging process. The values of these adjustment parameters depend on such factors as the size of the records (tracks with smaller records require more time to process since more records exist on a track), the speed of the channels, etc. that influence the speed of track processing. Simply stated, the faster the speed of track processing, the greater the number of tracks that should be prestaged into system memory 108. However, because the internal sequential detection system has no way to predict how far the sequential access will continue, there is the continuing risk of staging ahead too far.

The K5 adjustment parameter directly addresses this issue. The value of this adjustment parameter is similar to K1 (subsequent requests) but is used the first time sequentiality is detected. In a preferred embodiment, the initial value of K1 is eight and the initial value of K5 is three. In other words, the stage ahead request, based on a first detection of sequentiality, would cause three tracks rather than eight tracks to be prestaged into system memory 108. An example of this situation is transition 208 between states 2 to 128 in FIG. 2. In this transition, a first sequential detection is identified and three tracks are prestaged into system memory 108. In effect, the value of K5 is used to address the case of short runs that may not require the full length of a subsequent prestage request of eight tracks.

Transition 210 from state 1 to state 128, on the other hand, represents an exception. Since transition 210 was specifically designed to accommodate larger record sizes, the faster processing time for the larger records may require that more tracks be staged ahead. In this scenario, one embodiment envisions K1 tracks being prestaged. Clearly, the exact value of the number of tracks to be prestaged could be adjusted dynamically based on the size of the records relative to the size of the tracks.

Generally, once a track reaches any one of states 128–132, a request is issued to begin the prestaging of additional tracks. Once this request is issued, the state of that track is updated from any one of states 128–132 to state 255. This is illustrated by transition 232 in FIG. 2.

Concerning subsequent prestage requests, these requests are initiated based on the value of adjustment parameter K2 and the value in the PAR field stored in the directory entry for a particular track. As described in the previous section, the PAR field provides an indication of how many tracks ahead of the current track have been prestaged. Generally, the PAR value of a staged track is equal to the PAR value of the previous track minus one (with a minimum of zero). When a track is accessed in system memory 108 that has a PAR value equal to K2, then an additional K1 tracks are staged. This sequence is illustrated in FIGS. 3 and 4.

Figure 3:
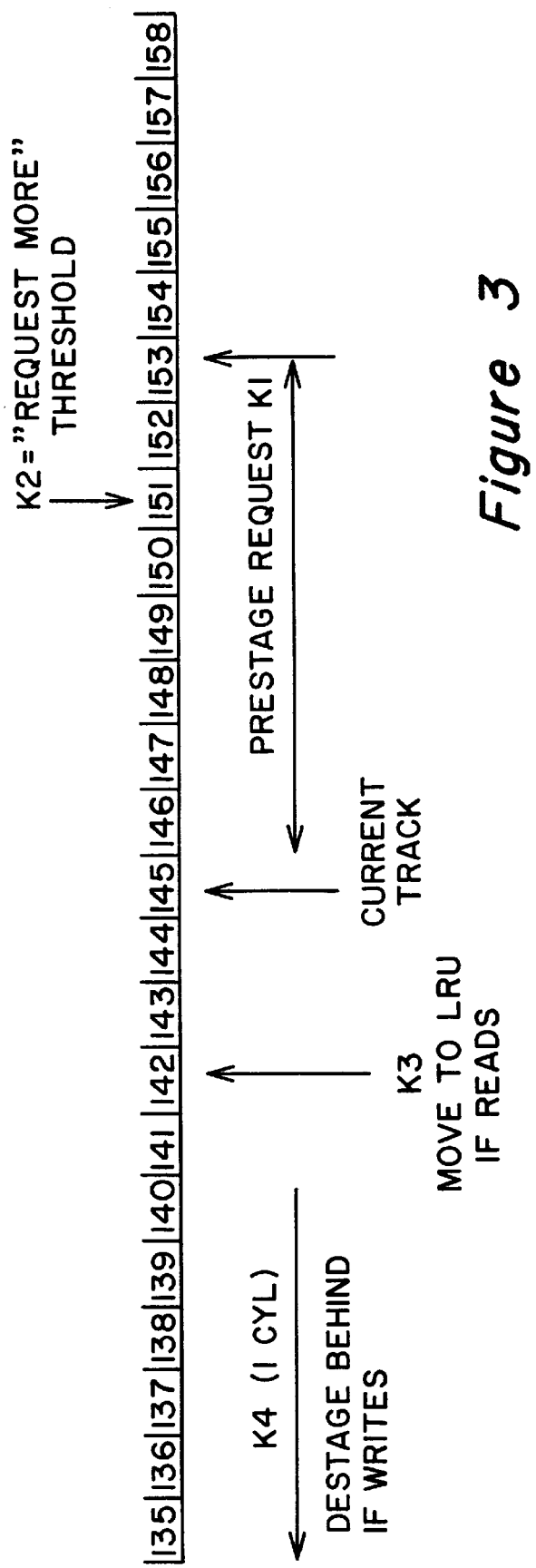

FIG. 3 shows a sequence of staging/destaging that relies on adjustment parameters K1–K4 described above. In this example, it is assumed that the initial stage ahead request at current track 145 staged eight tracks (tracks 146–153) ahead of current track 145. This situation could occur, for example, if track 144 was not staged and the sequential bit was set in a Define Extent command (i.e., ST=129).

As further illustrated in the track directory entries of FIG. 4, the PAR fields for tracks 145–150 show a decreasing sequence of numbers that represent the number of tracks staged ahead relative to that particular track. At track 150, the PAR value of three is still above the K2 value of two. Accordingly, no subsequent stage ahead request is sent. At track 151, on the other hand, the PAR value equals K2. At this point, the SAL field is referenced to identify the number of tracks to stage ahead. Since the SAL field contains the K1 value, this example would require that eight more tracks be staged. Once the staging is completed, the PAR value of track 151 is updated to ten.

Generally, adjustment parameters K1, K2 and K5 identify when and how far to stage ahead. To facilitate dynamic adjustment, the number of prestaged tracks that have not been accessed is monitored. If the number of non-accessed tracks becomes excessive, then adjustment parameters K1, K2 or K5 can be selectively decreased. Clearly, the specific method and thresholds for dynamic adjustment are implementation specific.

Concerning the destaging/deallocating process, adjustment parameters K3 and K4 are utilized. Adjustment parameter K3 identifies the track behind the current track that can be deallocated, if the current track hasn't been read. In a preferred embodiment, the initial value of K3 is three.

Adjustment parameter K4 is analogous to adjustment parameter K3 but is used if the current track or the one to be destaged has been written to. In a preferred embodiment, the initial value of adjustment parameter K4 is sixteen (or one cylinder). This particular value is implementation dependent. This value was chosen in order to prevent the data drive for destages from being the data drive that is being staged. By this design, reading and writing occur on separate physical disks. In one implementation, adjustment parameter K4 is dynamically adjusted to prevent a parity drive on destages from interfering with the stages.

FIG. 4 illustrates the operation of adjustment parameters K3 and K4. As illustrated, if the current track is track 145, a K3 value of three would cause track 142 to move to the least recently used (LRU) memory if current track 145 has not been read. Similarly, a K4 value of 16 (i.e., one cylinder) would indicate that track 140 would be destaged behind.

Termination of Sequential Mode

In the preferred embodiment, cache management system 100 efficiently identifies when to terminate sequential mode. In one embodiment, the slots in system memory 108 that contain staged tracks are logically linked based on the time of their most recent usage. Thus, the slots at the end of the logical chain define the least recently used (LRU) slots.

If host 110a–110b stops sequential accessing, tracks that have been prestaged will eventually fall into the LRU slots and be deallocated. Accordingly, the K3 adjustment parameter effectively controls termination. In alternative embodiments, the system is designed to anticipate when sequential accessing has stopped in order to get the unread cache slots available sooner.

While the invention has been particularly shown and described with reference to preferred embodiments thereof, it will be understood by those skilled in the relevant art that various changes in form and details may be made therein without departing from the spirit and scope of the invention.

What is claimed is:

1. A cache management system for detecting sequentiality in a series of memory accesses by a host system to data stored in tracks on any one of a plurality of storage devices, the cache management system comprising:
   a system memory for storing a data structure associated with each track, each data structure including a last sector/record referenced information field and a state information field;
   a cache controller for identifying a current track and a location within said current track of a record referenced in a current memory access, wherein the cache controller determines whether said current memory access and the previous M accesses to records in said current track are in sequence based on the values of said last sector/record referenced information field and said state information field associated with said current track, wherein M is at least 1.

2. The system of claim 1, wherein said cache controller identifies whether a record accessed in a subsequent access is next in a sequence of records as compared to a record accessed in a previous access, wherein said record accessed in said previous access is identified by the record number stored in said last sector/record referenced information field for said current track.

3. The system of claim 1, wherein said cache controller identifies whether a first sector accessed in a subsequent access is within an acceptable range from a last sector accessed in a previous access, wherein said last sector accessed in said previous access is identified by the sector number stored in said last sector/record referenced information field for said current track.

4. The system of claim 1, wherein said cache controller analyzes hints provided by a host system.

5. The system of claim 4, wherein said cache controller detects sequentiality when one of the following conditions is satisfied:
   a sequential bit is set in a Define Extent command;
   a Read Track command is received;
   a Read Multiple Count Key Data command is received; or
   a Write Count key and Data Next Track command is received.

6. A method for a cache controller to detect sequentiality in a series of memory accesses, comprising:
   (1) identifying a current track and a location within said current track of a record accessed in a first memory access, said record being the nth record in said current track;
   (2) storing a record number of said record accessed in said first memory access in a last sector/record referenced information field associated with said current track, wherein said last sector/record reference information field is part of a data structure associated with said current track;
   (3) setting a state information field associated with said current track to a first nonsequential state, wherein said state information field is part of said data structure associated with said current track;
   (4) upon a subsequent memory access to said current track, comparing the record number of a record accessed in said subsequent memory access to the value of said last sector/record referenced information field associated with said current track;
   (5) setting said state information field associated with said current track to a second nonsequential state if said last sector/record referenced information field indicates that said record accessed in said subsequent memory access is the record following the record identified by said last sector/record referenced information field associated with said current track;
   (6) updating said last sector/record referenced information field to the record number of said record accessed in said subsequent memory access;
   (7) upon a further subsequent memory access to said current track, comparing the record number of a record accessed in said further subsequent memory access to the value of said last sector/record referenced information field of said current track; and
   (8) setting said state of said track to a sequential state if said last sector/record referenced information field indicates that said record accessed in said further subsequent memory access is the record following the record that is identified in said last sector/record referenced information field of said current track.

7. The method of claim 6, wherein prior to setting a state information field associated with said current track to a first nonsequential state, the following are performed:
   identifying the value of said state information field in said data structure of the track previous to said current track; and
   if said state information field of said previous track indicates a sequential state, setting said state information field associated with said current track to a sequential state.

8. The method of claim 7, wherein prior to setting a state information field associated with said current track to a second nonsequential state,
   the state information field associated with the current track is set to a sequential state if less than four records can be stored per track and if said last sector/record referenced information field indicates that said record accessed in said subsequent memory access is the record following the record identified by said last sector/record referenced information field associated with said track.

9. The method of claim 8, further comprising immediately setting said state information field of said current track to a sequential state when a hint of sequentiality is provided by a host system.

10. The method of claim 9, wherein immediately setting comprises:

setting said state information field of said current track to a sequential state when a sequential bit is set in a Define Extent command;

setting said state information field of said current track to a sequential state when a Read Track command is received;

setting said state information field of said current track to a sequential state when a Read Multiple Count Key Data command is received; and setting said state information field of said current track to a sequential state when a Write Count Key and Data Next Track command is received.

11. A method for a cache controller to detect sequentiality in a series of memory accesses, comprising:

(1) identifying a current track and a location within said current track of a record referenced in a current memory access;

(2) determining whether said current memory access and the previous M (M≧1) accesses to records in said current track are in sequence based on the values of a last sector/record referenced information field and a state information field associated with said current track; and (3) setting said state information field to a sequential state if said current access and the previous M accesses are in sequence.

12. The method of claim 11, wherein determining whether said current memory access and the previous M (M≧1) accesses to records in said current track are in sequence comprises:

(a) storing, in the last sector/record referenced information field, the number of the record accessed in a first access to said current track; and (b) identifying whether a record accessed in a subsequent access is next in a sequence of records as compared to the record number in the last sector/record referenced information field for said current track.

13. The method of claim 11, wherein determining whether said current memory access and the previous M (M≧1) accesses to records in said current track are in sequence comprises:

(a) storing, in the last sector/record referenced information field, the number of the sector at the end of the last transfer done on said current track during a first access to said current track; and (b) identifying whether a first sector accessed in a subsequent access is within an acceptable range from the sector identified by the last sector/record referenced information field for said current track.

14. The method of claim 11, further comprising immediately setting said state information field of said current track to a sequential state when a hint of sequentiality is provided by a host system.

15. The method of claim 14, wherein immediately setting comprises:

setting said state information field of said current track to a sequential state when a sequential bit is set in a Define Extent command;

setting said state information field of said current track to a sequential state when a Read Track command is received; and setting said state information field of said current track to a sequential state when a Read Multiple Key Data command is received; and setting said state information field of said current track to a sequential state when a Write Count Key and Data Next Track command is received.

* * * * *